United States Patent Office 3,730,944
Patented May 1, 1973

3,730,944
PROCESS FOR THE PREPARATION OF POLY-PHENYLENE ETHERS WITH PROMOTED COPPER-AMINE CATALYSTS
James G. Bennett, Menands, and Arthur Katchman, Delmar, N.Y., assignors to General Electric Company
No Drawing. Filed Apr. 30, 1971, Ser. No. 139,216
Int. Cl. C08g 23/18
U.S. Cl. 260—47 ET   16 Claims

ABSTRACT OF THE DISCLOSURE

There is disclosed an improved process for the preparation of high molecular weight polyphenylene ethers by oxidatively coupling a di-ortho-substituted phenolic precursor in a reaction system containing oxygen and a complex catalyst formed from a copper salt and either a primary, secondary or tertiary amine and an alkylene carbonate or a dialkyl sulfoxide promotor or a primary or tertiary amine and a dialkyl formamide promotor. Use of the promotors results in the formation of higher molecular weight polymer in a given reaction time or polymer of comparable molecular weight in substantially decreased reaction time.

This invention relates to the formation of synthetic polymers from phenolic precursors, and more particularly, to the formation of polyphenylene ethers by the oxidative coupling of a 2,6-di-substituted phenol in a reaction system containing oxygen and a complex catalyst formed from a copper salt and either a primary, secondary or tertiary amine and an alkylene carbonate or dialkyl sulfoxide promotor or a primary or tertiary amine and a dialkyl formamide promotor.

BACKGROUND OF THE INVENTION

The polyphenylene ethers and processes for their formation are known in the art and described in numerous publications including Hay, U.S. 3,306,874 and 3,306,875, and others.

In general, all such processes involve the oxidative self-condensation of a monovalent phenolic precursor using oxygen and a catalyst comprising an amine-copper salt complex. Phenols which are polymerized by the process are monovalent phenols having substitution in at least the two ortho positions and hydrogen or halogen in the para position. By way of illustration, they correspond to Formula I:

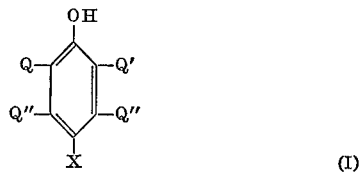

(I)

where X is a substituent selected from the group consisting of hydrogen, chlorine, bromine and iodine, Q is a monovalent substituent selected from the group consisting of hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and the phenol nucleus; and Q' and Q'' are the same as Q and in addition, halogen, with the proviso that Q, Q' and Q'' are all free of a tertiary alpha-carbon atom. Polymers formed from the above-noted phenols will therefore correspond to Formula II:

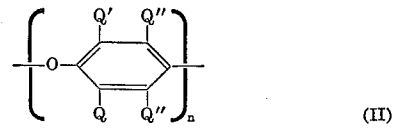

(II)

where the oxygen ether atom of one repeating unit is connected to the phenylene nucleus of the next repeating unit; Q, Q' and Q'' are as above defined; and $n$ is a whole integer equal to at least 50.

According to the process of the Hay patents, the formation of the polyphenylene ethers involves the self-condensation of the phenolic compound in the presence of oxygen and a catalyst system comprising an amine-cupric salt complex. It is disclosed that the copper salt used to form the complex catalyst is not critical and may be either a basic cupric salt or cuprous salt, provided only that if a cuprous salt is use, it must be capable of existing in the cupric state. Various methods are reported for forming the complex catalysts starting with the copper salts. For example, a reducing agent can be used with a cupric salt to form the cuprous salt in situ, which in turn forms the amine-cupric salt complex when admixed with the amine. Alternatively, the complex can be formed between an amine and a basic cupric salt formed by reacting cupric salts with an alkaline salt of a phenol, by treating a cupric salt with an ion exchange resin having exchangeable hydroxyl groups, by adding a base to a cupric salt, or by adding cupric hydroxide to a cupric salt. For full details regarding the preparation of such complexes from copper salts and primary, secondary and tertiary amines and their use in the oxidative coupling of phenols, reference is made to the above-mentioned Hay patents.

It has now been found that certain compounds, when added to the reaction mixtures containing complex copper-amine catalysts, for some as yet unexplained reason, exert a beneficial promoting effect. In essence, therefore, the process of this invention is an improvement over other processes in the prior art in that—because a promotor is present in the reaction medium—the molecular weight of the polyphenylene ether formed is higher than otherwise available in a given reaction time, or alternatively, the reaction time is shorter for recovery of polymer of comparable molecular weight.

DESCRIPTION OF THE INVENTION

The above-mentioned advantages are secured according to this invention which is, in essence:

The improvement in a process for the preparation of a high molecular weight polyphenylene ether having a degree of polymerization of at least about 50 by oxidatively coupling a monovalent phenol having substitution in at least the two ortho positions and hydrogen or halogen in the para position, using oxygen and a complex catalyst as an oxidizing agent, characterized in that there is used as said complex catalyst (i) a cuprous or a cupric salt and a primary, secondary or tertiary amine and, as a promotor for said catalyst, an alkylene carbonate, e.g., a $C_2$–$C_6$ alkylene carbonate;

(ii) a cuprous or a cupric salt and a primary, secondary or tertiary amine and, as a promotor for said catalyst, a dialkyl sulfoxide, e.g., a di(lower)alkyl sulfoxide, containing from 1 to 6 carbon atoms per alkyl group; or (iii) a cupric salt and a primary or tertiary amine and, as a promotor for said catalyst, a dialkyl formamide, e.g., a di(lower)alkyl formamide, containing from 1 to 6 carbon atoms per alkyl group, said promotor being present in the reaction mixture in an amount at least sufficient to increase the rate of oxidative coupling.

According to one preferred feature of this invention there is provided such an improved process wherein the catalyst is a cuprous or a cupric salt and a primary, secondary or tertiary amine and the promotor is an alkylene carbonate, preferably ethylene carbonate. It is surprising to find that alkylene carbonates are uniquely effective, since both dimethyl carbonate and diethyl carbonate do not give rate enhancement.

According to another preferred feature of this invention there is provided such an improved process wherein the catalyst is a cuprous or cupric salt and a primary, secondary or tertiary amine and the promotor is a dialkyl sulfoxide, preferably a di(lower)alkyl sulfoxide and, most preferably, dimethyl sulfoxide.

According to still another preferred feature of this invention, there is provided such an improved process wherein the catalyst is a cupric salt and a primary or tertiary amine and the promotor is a dialkyl formamide, preferably a di(lower)alkyl formamide and, most preferably, dimethyl formamide. It is surprising to find that such a promotor is ineffective if either a cuprous salt or a secondary amine is used. In either case, no rate enhancement being seen with dialkylformamides.

The improved process of this invention is broadly applicable to all of the phenols disclosed in the above-mentioned Hay patents, but is preferably used with phenols of Formula I above. The most preferred phenols for purposes of the present invention are those of Formula I wherein Q and Q' are hydrcarbon radicals having from 1 to 8 carbon atoms and Q'' are each hydrogen. Illustrative of such preferred phenols are 2,6-dimethylphenol, 2,6-diethylphenol, 2 - methyl - 6 - ethylphenol, 2-methyl-6-allylphenol, 2-methyl - 6 - phenylphenol, 2,6-diphenylphenol, 2,6-dibutylphenol and 2-methyl-6-propylphenol. Especially preferred as a phenolic starting material is 2,6-dimethylphenol, also known as 2,6-xylenol (Q and Q' are each methyl radicals).

The polyphenylene ethers prepared by the present process will correspond to the phenolic precursors and will include those of Formula II.

The primary, secondary or tertiary amine component of the catalyst complex corresponds to those disclosed in the above-mentioned Hay patents. Illustrative members include aliphatic amines, including aliphatic mono- and di-amines, where the aliphatic group can be straight or branched chain hydrocarbon or cycloaliphatic. Preferred are aliphatic monoamines. Especially preferred are mono-, di- and tri(lower)alkyl amines, the alkyl groups having from 1 to 12 carbon atoms. Typically, there can be used mono-, di- and tri-methyl, ethyl, n-propyl, i-propyl, n-butyl substituted amines, mono- and di-cyclohexylamine, ethylmethyl amine, morpholine, methylcyclohexylamine, N,N'-dialkylethylenediamines, the N'N'-dialkylpropanediamines, the N,N,N'-trialkylpentanediamines, dimethyl lauryl amine, and the like.

Mixtures of such primary, secondary and tertiary amines may be used if desired. A preferred mono(lower) alkyl amine is n-butyl amine; a preferred di(lower)alkyl amine is di-n-butyl amine; and a preferred tri(lower) alkyl amine is triethyl amine. The concentration of primary and secondary amine in the reaction mixture may vary within wide limits, but is desirably added in low concentrations. A preferred range comprises from about 2.0 to 25.0 moles per 100 moles of monovalent phenol. In the case of a tertiary amine, the preferred range is considerably higher, and comprises from about 500 to about 1500 moles of monovalent phenol.

Typical examples of cuprous salts and cupric salts suitable for the process are shown in the Hay patents. These will include cuprous chloride, cuprous bromide, cuprous sulphate, cuprous azide, cuprous tetramine sulfate, cuprous acetate, cuprous butyrate, cuprous toluate, cupric chloride, cupric bromide, cupric sulfate, cupric azide, cupric tetramine sulfate, cupric acetate, cupric butyrate, cupric toluate, and the like. Preferred cuprous and cupric salts are the halides, cuprous bromide and cuprous chloride, cupric bromide and cupric chloride being most preferred. With primary and secondary amines, the concentration of the copper salts is desirably maintained low and preferably varies from about 0.2 to 2.5 moles per 100 moles of monovalent phenol. With tertiary amines, the copper salt is preferably used in an amount providing from about 4 to about 15 moles per 100 moles of the monovalent phenol.

Only a small quantity of the promotor is needed to effectively enhance the rate of reaction and increase the molecular weight of the polyphenylene ethers. Good results are obtained with as little as 0.1 mole of promotor per 100 moles of phenolic precursor. In general, up to about 750 moles per 100 moles of phenolic precursor can be used, although it is preferred to use no more than about 500 moles per 100 moles of phenol. In all cases, it has been found that use of a very large excess of promotor, e.g., using the promotor as a reaction solvent, has the tendency of causing exactly the opposite deisred effect—polymer molecular weight is decreased and the reaction rate is slowed down. The promotors are readily available or can be prepared in known ways.

The polymerization reaction is preferably performed in a solvent. Suitable solvents are disclosed in the above noted Hay patents. Aromatic solvents such as benzene, toluene, o-dichlorobenzene and xylene are especially preferred, although tetrachloromethane, trichloromethane, dichloromethane, 1,2-dichloroethane, trichloroethylene, dichloroethylene and halogenated hydrocarbons, in general, may also be used.

The process for forming the polymer and the reaction conditions, such as temperature, oxygen, flow rate and the like are essentially the same as the conditions disclosed in the above-mentioned Hay patents, though reaction time to generate high molecular weight polymer is reduced. The above noted concentration ranges were preferred, though these ranges may vary to some extent depending upon oxygen flow rate, reaction temperature and the like.

In a preferred manner of proceeding, a suitable reaction vessel is charged with the solvent, the copper salt and the amine. The mixture is stirred for a short time, sufficient to mix the ingredients, e.g., 5 minutes, then the promotor is added. Then the phenolic precursor is added and well mixed. Oxygen is next passed into the stirred mixture for the desired period, e.g., 120 minutes, and the reaction temperature is maintained at between 15 and 30° C., preferably at about 25° C., cooling if necessary. Polymerization is terminated in a known way, e.g., by adding aqueous acetic acid. The product is recovered in a known way, e.g., by separating the aqueous acid layer by centrifugation and adding a non-solvent for the polymer, e.g., methanol, to the organic layer until the polyphenylene ether has been substantially completely precipitated. The polymer is reslurried in a non-solvent, e.g., methanol, and vacuum dried. The theoretical yield is calculated from the polymer weight. The degree of polymerization, i.e., relative molecular weight, is directly proportional to the intrinsic viscosity. This is determined in a known way, e.g., by measuring the viscosity of a dilute chloroform solution of the polymer at 30° C.

The polyphenylene ethers prepared by the process of this invention are useful for all the purposes disclosed in the above-mentioned Hay patents. For example, they can be used in molded articles or in films, tapes and the like. They may be mixed with other resins, or various fillers, reinforcements, dyes, pigments, stabilizers, plasticizers and the like.

DESCRIPTION OF THE PREFERRED EMBODIMENTS

The following examples illustrate the processes of this invention. They are merely illustrative and are not to be

EXAMPLE 1

To a tube type reaction vessel, fitted with a stirrer, thermometer and oxygen inlet tube, are added 140 ml. of toluene, 0.223 g. (0.001 mole) of anhydrous cupric bromide and 0.73 g. (0.01 mole) of n-butylamine. The mixture is stirred for 5 minutes and then 4.4 g. (0.05 mole) of ethylene carbonate promoter is added followed by 10.0 g. (0.082 mole) of 2,6-xylenol. The mole ratio of 2,6-xylenol:copper salt:amine:promoter is 82:1:10:50. Oxygen is passed through the stirred reaction mixture for 120 minutes, while the temperature of the reaction mixture is maintained at 25° C. The polymerization is terminated by adding an excess of aqueous acetic acid, the acid layer is removed by centrifugation and the poly(2,6-dimethyl-1,4-phenylene)ether is precipitated with an excess of methanol. The polymer is reslurried with methanol, filtered and dried in a vacuum until a constant weight is reached.

There is obtained a 91.8% yield of product which has an intrinsic viscosity of 0.51 deciliters/gram (chloroform solvent, 30° C.).

For comparison purposes, the procedure of this example is repeated, omitting the ethylene carbonate.

There is obtained a 91.8% yield of product with a lower molecular weight, intrinsic viscosity, 0.42 dl./g.

EXAMPLE 2

The procedure of Example 1 is repeated, increasing the amount of ethylene carbonate promoter from 4.4 g. (0.05 mole to 8.8 g. (0.1 mole).

There is obtained a 91.8% yield of poly(2,6-dimethyl-1,4-phenylene)ether of still higher molecular weight, intrinsic viscosity, 0.56 dl./g.

For comparison purposes, the procedure of this example is repeated substituting for the 0.1 mole of ethylene carbonate, respectively, 0.1 mole of dimethyl carbonate and 0.1 mole of diethyl carbonate.

With dimethyl carbonate, the yield of polymer is 93.8% but the molecular weight is lower, intrinsic viscosity, 0.42 dl./g. and the same as the control (Example 1, without promoter). With diethyl carbonate, both the yield 91.8% and the intrinsic viscosity, 0.41 dl./g. are substantially the same as those of the control.

EXAMPLE 3

The procedure of Example 1 is repeated, substituting for the cupric bromide, 0.001 mole of cuprous bromide, and for the n-butylamine, 0.01 mole of di-n-butylamine, and doubling the amount of ethylene carbonate promoter to 0.1 mole. The mole ratio of 2,6-xylenol:copper salt:amine:promoter is 82:1:10:100.

There is obtained a 95.0% yield of poly(2,6-dimethyl-1,4-phenylene)ether with an intrinsic viscosity of 0.68 dl./g.

For comparison purposes, the procedure of this example is repeated, omitting the promoter.

There is obtained a lower yield, 91.8%, of lower molecular weight product, intrinsic viscosity 0.60 dl./g.

EXAMPLE 4

The procedure of Example 1 is repeated, substituting for the cupric bromide, 0.001 mole of cuprous bromide, and doubling the amount of ethylene carbonate promoter to 0.1 mole. The mole ratio of 2,6-xylenol:copper salt:amine:promoter is 82:1:10:100.

There is obtained a 92.8% yield of poly(2,6-dimethyl-1,4-phenylene)ether with an intrinsic viscosity of 0.44 dl./g.

For comparison purposes, the procedure of this example is repeated, omitting the promoter.

There is obtained a slightly higher yield, 93.8%, of lower molecular weight product, intrinsic viscosity, 0.36 dl./g.

EXAMPLE 5

The procedure of Example 1 is repeated, substituting for the cupric bromide, 0.00372 mole of cupric chloride, and for the n-butyl amine, 0.396 mole of triethyl amine. The amount of ethylene carbonate is increased from 0.05 mole to 0.284 mole. The 2,6-xylenol is decreased to 5 g. (0.041 mole). The ratio of 2,6-xylenol to copper salt to amine to promoter is 11:1:107:77.

There is obtained a 77.5% yield of poly(2,6-dimethyl-1,4-phenylene)ether with an intrinsic viscosity of 0.70 dl./g.

For comparison, purposes, the procedure of this example is repeated, omitting the promoter.

There is obtained a slightly higher yield of polymer of much lower molecular weight, intrinsic viscosity, 0.17 dl./g.

As is illustrated in the above Examples 1–5, alkylene carbonates will increase the polymerization rate with cuprous and cupric salts using primary, secondary and tertiary amines.

It is also seen that, unexpectedly, dimethyl carbonate and diethyl carbonate, open chain analogs of the alkylene carbonates, do not give rate enhancement and thus are ineffective as promotors.

EXAMPLE 6

To a tube type reaction vessel, fitted with a stirrer, thermometer and oxygen inlet tube, are added 140 ml. of toluene, 0.144 g. (0.001 mole) of cuprous bromide, 0.73 g. (0.01 mole) of n-butyl amine and 7.8 g. (0.082 mole) of dimethyl sulfoxide. The mixture is stirred for 5 minutes, after which 10.0 g. (0.082 mole) of 2,6-xylenol is added. The mole ratio of 2,6-xylenol:copper salt:amine:promoter is 82:1:10:100. Oxygen is passed through the stirred reaction mixture for 120 minutes, while maintaining the reaction temperature at 25° C. The polymerization is terminated with aqueous acetic acid, the acid layer is removed by centrifugation and the poly(2,6-dimethyl-1,4-phenylene)ether is precipitated with methanol. The polymer is reslurried in methanol, filtered and vacuum dried to a constant weight.

There is obtained 9.3 g. (95% yield) of product which has an intrinsic viscosity of 0.52 dl./g. (chloroform solvent, 30° C.).

For comparison purposes, the procedure of this example is repeated, omitting the dimethyl sulfoxide.

There is obtained a 94% yield of product with a lower molecular weight, intrinsic viscosity 0.36 dl./g.

EXAMPLE 7

The procedure of Example 6 is repeated, substituting for the cuprous bromide, 0.001 mole of cupric bromide.

There is obtained poly(2,6 - dimethyl-1,4-phenylene) ether having an intrinsic viscosity of 0.59 dl./g.

For comparison purposes, the procedure of this example is repeated, omitting the dimethyl sulfoxide.

There is obtained a lower molecular weight product, intrinsic viscostiy, 0.44 dl./g.

EXAMPLE 8

The procedure of Example 6 is repeated, substituting for the cuprous bromide, 0.001 mole of cupric bromide, and for the n-butyl amine, 0.01 mole of di-n-butyl amine.

There is obtained poly(2,6 - dimethyl-1,4-phenylene) ether in 92% yield with an intrinsic viscosity of 0.79 dl./g.

For comparison purposes, the procedure of this example is repeated, omitting the dimethyl sulfoxide.

There is obtained a slightly higher yield, 95% of product which has lower molecular weight, 0.60 dl./g.

EXAMPLE 9

The procedure of Example 6 is repeated, substituting for the cuprous bromide, 0.00372 mole of cupric chloride, and for the n-butyl amine, 0.396 mole of triethyl amine. The amount of dimethyl sulfoxide is increased from 0.082 mole to 0.320 mole. The 2,6-xylenol is decreased to 5 g. (0.041 mole). The mole ratio of 2,6-xylenol:copper salt:amine:promotor is 11:1:107:86.

There is obtained a 94% yield of poly(2,6-dimethyl-1,4-phenylene)ether with an intrinsic viscosity of 1.22 dl./g.

For comparison purposes, the procedure of this example is repeated, omitting the promotor.

There is obtained a lower yield, 82% of polymer of much lower molecular weight, intrinsic viscosity, 0.17 dl./g.

As is illustrated in the above Examples 6–9, dialkyl sulfoxides will increase the polymerization rate with cuprous and cupric salts using primary, secondary and tertiary amines.

EXAMPLE 10

To a tube type reaction vessel, fitted with a stirrer, thermometer and oxygen inlet tube, are added 135.8 ml. of toluene, 0.233 g. (0.001 mole) of anhydrous cupric bromide, 0.73 g. (0.01 mole) of n-butyl amine and 7.3 g. (0.1 mole) of dimethyl formamide promotor. The mixture is stirred for 5 minutes and then 10.0 g. (0.082 mole) of 2,6-xylenol is added. The mole ratio of 2,6-xylenol:copper salt:amine:promotor is 82:1:10:100. Oxygen is passed through the stirred reaction mixture for a period of 120 minutes, while maintaining the temperature at 25° C. Polymerization is terminated by adding aqueous acetic acid, the acid layer is removed by centrifugation and the polymer is precipitated with an excess of methanol. The polymer is reslurried in methanol, and dried in a vacuum until a constnt weight is reached.

There is obtained poly(2,6 - dimethyl-1,4-phenylene) ether, 8.9 g., 91% yield, which has an intrinsic viscosity of 0.73 dl./g. (chloroform solvent, 30° C.).

For comparison purposes, the procedure of this example is repeated, omitting the dimethyl formamide.

There is obtained a slightly higher yield, 92%, of product with a much lower molecular weight, intrinsic viscosity 0.42 dl./g.

EXAMPLE 11

The procedure of Example 10 is repeated, decreasing the amount of dimethyl formamide from 0.1 mole to 0.01 mole.

There is obtained a 91% yield of poly(2,6-dimethyl-1,4-phenylene)ether, intrinsic viscosity, 0.47 dl./g., higher than the control (Example 1), but lower than the product of Example 1.

For comparison purposes, the procedure of Example 11 is repeated, substituting for the 135.8 ml. of toluene solvent, an equal volume of dimethyl formamide.

The molecular weight of the product is substantially decreased, intrinsic viscosity, 0.23 dl./g.

For comparison purposes, the procedure of Example 11 is repeated, substituting for the cupric bromide, 0.001 mole of cuprous bromide.

There is obtained a 96% yield of poly(2,6-dimethyl-1,4-phenylene)ether which has an intrinsic viscosity of 0.37 dl./g.

For comparison purposes, the procedure with cuprous bromide is repeated, omitting the dimethyl formamide.

The yield of polymer decreases only slightly to 94% and the intrinsic viscosity is substantially the same, 0.36 dl./g.

For comparative purposes, the procedure of Example 10 is repeated, substituting for the n-butyl amine, 0.01 mole of di-n-butyl amine. The procedure is also repeated, using di-n-butyl amine, and omitting the dimethyl formamide.

With the secondary amine and dimethyl formamide, the yield of poly(2,6-dimethyl-1,4-phenylene)ether is 93% and the intrinsic viscosity is 0.60 dl./g. Without the dimethyl formamide, the yield is *better*, 95% and intrinsic viscosity is the same, 0.60 dl. per gram.

For comparative purposes, the procedure of Example 10 is repeated, substituting for the cupric bromide, 0.001 mole of cuprous bromide, and for the n-butyl amine, 0.01 mole of di-n-butyl amine.

There is obtained a 94% yield of poly(2,6-dimethly-1,4-phenylene)ether, which has an intrinsic viscosity of 0.28 dl./g.

The procedure is repeated with cuprous bromide and di-n-butyl amine, omitting the dimethyl formamide.

The product is obtained in 92% yield and has a substantially higher molecular weight, intrinsic viscosity, 0.60 dl./g.

Repeating this comparative example with 0.01 mole of dimethyl formamide provides a product with slightly higher molecular weight, intrinsic viscosity, 0.45 dl./g., but still lower than that of the control (without dimethyl formamide), 0.60 dl./g. Replacement of the solvent, toluene, with an equal volume of dimethyl formamide (therefore, a large excess) causes the polymer yield to drop to 43% and the molecular weight to fall to the lowest level seen, intrinsic viscosity, 0.18 dl./g.

EXAMPLE 12

The procedure of Example 10 is repeated, substituting for the cupric bromide, 0.00372 mole of cupric chloride, and for the n-butyl amine, 0.396 mole of triethyl amine. The amount of dimethyl formamide is increased from 0.1 mole to 0.342 mole. The 2,6-xylenol is decreased to 5 g. (0.041 mole). The mole ratio of 2,6-xylenol:copper salt:amine:promotor is 11:1:107:92.

There is obtained a 94% yield of poly(2,6-dimethyl-1,4-phenylene)ether with an intrinsic viscosity of 1.12 dl./g.

For comparison purposes, the procedure of this example is repeated, omitting the promotor. There is obtained a lower yield, 82%, of polymer of much lower intrinsic viscosity, 0.17 dl./g.

As is illustrated in Examples 10–12, the addition of small to moderate amounts of a dialkyl formamide promotes the polymerization rates of cupric halides and primary, secondary and tertiary amines.

It is surprising to observe that dialkyl formamides do not enhance the polymerization rate with cuprous salts with primary amines or that with either cuprous or cupric salts and secondary amines.

Although the above examples have shown various modifications of the present invention, other variations are possible in light of the above teachings. It is therefore to be understood that changes may be made in the particular embodiments of the invention described which are within the full intended scope of the invention as defined by the appended claims.

We claim:

1. In a process for the preparation of a high molecular weight polyphenylene ether having a degree of polymerization of at least 50 by oxidatively coupling a monovalent phenol having substitution in at least the two ortho positions and hydrogen or halogen in the para position, using oxygen and a complex catalyst as an oxidizing agent, the improvement which consists of using as said complex catalyst a cuprous or a cupric salt and a primary, secondary or tertiary amine and, as a promotor for said catalyst, an alkylene carbonate, said promotor being present in the reaction mixture in an amount of from 0.1 to 750 moles per 100 moles of said monovalent phenol.

2. A process as defined in claim 1 wherein said promotor is ethylene carbonate.

3. A process as defined in claim 1 wherein said polyphenylene ether is of the formula

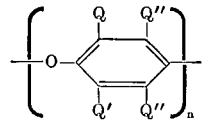

wherein

Q is a hydrocarbon radical, a halohydrocarbon radical having at least two carbon atoms between the halogen atom and the phenol nucleus, a hydrocarbonoxy radical or a halohydrocarbonoxy radical having at least two carbon atoms between the halogen atom and the phenol nucleus; and Q' and Q" are the same as Q and, in addition halogen, provided that Q, Q', Q" are all free of a tertiary alpha-carbon atom, and $n$ is at least 50.

4. A process as defined in claim 3 wherein Q and Q' are hydrocarbon radicals having from 1 to 8 carbon atoms and Q" are each hydrogen.

5. A process as defined in claim 4 wherein Q and Q' are each methyl radicals.

6. A process as defined in claim 1 wherein said salt is a cuprous halide or a cupric halide.

7. A process as defined in claim 6 wherein said halide is a chloride or bromide.

8. A process as defined in claim 1 wherein said amine is an aliphatic monoamine.

9. A process as defined in claim 8 wherein said amine is a mono(lower)alkyl amine.

10. A process as defined in claim 9 wherein said amine is n-butyl amine.

11. A process as defined in claim 8 wherein said amine is a di-(lower)alkyl amine.

12. A process as defined in claim 11 wherein said amine is di-n-butyl amine.

13. A process as defined in claim 8 wherein said amine is a tri-(lower)alkyl amine.

14. A process as defined in claim 13 wherein said amine is triethyl amine.

15. A process as defined in claim 1 wherein, said catalyst includes a primary or a secondary amine, and said amine comprises from about 2.0 to about 25 moles per 100 moles of said monovalent phenol and said salt comprises from about 0.2 to about 2.5 moles per 100 moles of said monovalent phenol.

16. A process as defined in claim 1 wherein, said catalyst includes a tertiary amine, and said amine comprises from about 500 to about 1500 moles per 100 moles of said monovalent phenol and said salt comprises from about 4 to about 15 moles per 100 moles of said monovalent phenol.

No references cited.

MELVIN GOLDSTEIN, Primary Examiner